United States Patent
Venkatesh

(10) Patent No.: US 12,407,604 B2
(45) Date of Patent: Sep. 2, 2025

(54) LOOP PROTECTION IN A NETWORK

(71) Applicant: HEWLETT PACKARD ENTERPRISE DEVELOPMENT LP, Spring, TX (US)

(72) Inventor: Rashmi Venkatesh, Karnataka (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 1 day.

(21) Appl. No.: 18/448,272

(22) Filed: Aug. 11, 2023

(65) Prior Publication Data

US 2025/0055787 A1 Feb. 13, 2025

(51) Int. Cl.
*H04L 45/28* (2022.01)
*H04L 45/00* (2022.01)
*H04L 45/74* (2022.01)

(52) U.S. Cl.
CPC ............ *H04L 45/28* (2013.01); *H04L 45/566* (2013.01); *H04L 45/74* (2013.01)

(58) Field of Classification Search
CPC ........ H04L 45/28; H04L 45/566; H04L 45/74
See application file for complete search history.

(56) References Cited

U.S. PATENT DOCUMENTS

| | | | | |
|---|---|---|---|---|
| 6,169,724 B1 * | 1/2001 | Begum | .................... | H04M 3/32 340/3.7 |
| 2008/0267081 A1 * | 10/2008 | Roeck | ..................... | H04L 47/32 370/249 |
| 2008/0291910 A1 | 11/2008 | Tadimeti et al. | | |
| 2009/0219821 A1 * | 9/2009 | Kamachi | ................ | H04L 12/437 370/242 |
| 2009/0274054 A1 * | 11/2009 | Wakumoto | ............ | H04L 12/462 370/242 |
| 2009/0282145 A1 * | 11/2009 | Niimi | ...................... | H04L 41/12 709/224 |
| 2010/0238806 A1 * | 9/2010 | Saito | ................ | H04N 21/43632 370/241 |
| 2011/0238346 A1 * | 9/2011 | Song | .................... | G01R 31/001 702/65 |
| 2013/0003601 A1 * | 1/2013 | Gupta | ..................... | H04L 45/18 370/254 |
| 2016/0254980 A1 * | 9/2016 | Nakayasu | ............. | H04L 49/506 370/241 |

(Continued)

FOREIGN PATENT DOCUMENTS

WO 2011/140890 A1 11/2011

OTHER PUBLICATIONS

Hewlett Packard Enterprise, Loop Protection, 2018 (3 pages), (Year: 2018).*

(Continued)

*Primary Examiner* — Chris Parry
*Assistant Examiner* — Dixon F Dabipi
(74) *Attorney, Agent, or Firm* — Trop, Pruner & Hu, P.C.

(57) ABSTRACT

In some examples, a forwarding device detects a network loop for a port of the forwarding device. Based on determining that the quantity of network loop detections for the port exceeds a threshold, the forwarding device adds a first information element indicating an identity of the forwarding device to a payload of a loop protect packet, and sends the loop protect packet containing the first information element from the port to the network.

20 Claims, 5 Drawing Sheets

(56) References Cited

U.S. PATENT DOCUMENTS

| | | | |
|---|---|---|---|
| 2020/0067821 A1* | 2/2020 | Sebastian | H04L 45/28 |
| 2021/0377166 A1 | 12/2021 | Brar et al. | |
| 2022/0209994 A1* | 6/2022 | Tai | H04L 12/42 |
| 2023/0344743 A1* | 10/2023 | Mullis | H04L 45/18 |
| 2024/0022451 A1* | 1/2024 | Dikshit | H04L 12/42 |

OTHER PUBLICATIONS

Aruba, loop-protect re-enable timer, downloaded Jul. 12, 2023 (1 page).
cisco.com, Configuring Loop Detection Guard, downloaded Jul. 12, 2023 (6 pages).
Hengartner et al., Detection and Analysis of Routing Loops in Packet Traces, 2002 (6 pages).
Hewlett Packard Enterprise Development, "Configuring loop protection," May 4, 2023, https://www.arubanetworks.com/techdocs/AOS-CX/10.09/HTML/12_bridging_4100i-6000-6100-6200/Content/Chp_loop_pro/cnf-loo-pro.htm (2 pages).
Hewlett Packard Enterprise, Loop Protection, 2018 (3 pages).
Juniper Networks, Loop Protection for Spanning-Tree Protocols, Feb. 18, 2021 (20 pages).
Wikipedia, Swtiching loop, downloaded Jul. 12, 2023 (2 pages).
Wikipedia, "Type-length-value," Apr. 29, 2023, https://en.wikipedia.org/w/index.php?title=Type%E2%80%93length%E2%80%93value&oldid=1152349261 (2 pages).
Cisco, "ACI Layer 2 loop detection and Mitigation", available online at <https://www.youtube.com/watch?v=fFZ3d-bnD0c>, Feb. 23, 2022, 14 pages.
Let US Simplify Technology, "12 How L2 loop detection works using MCP policy in ACI", available online at <12 How L2 loop detection works using MCP policy in ACI—YouTube>, Apr. 12, 2020, 3 pages.
Lukas Krattiger, "Detecting and Mitigating Loops in VXLAN Networks", available online at <https://blogs.cisco.com/datacenter/detecting-and-mitigating-loops-in-vxlan-networks>, Sep. 16, 2020, 12 pages.
Pluribus Networks, "Achieving a Loop-Free Layer 2 Topology", available online at <<https://techdocassets.pluribusnetworks.com/netvisor/nv1_700/CG/AchievingaLoop-FreeLayer2Topolo1.html>.>, Netvisor ONE Configuration Guide 7.0.0, , Feb. 2022, 6 pages.
Shambhu Nath Mishra, "Live Demo!! Layer-2 switching loop in the network and mitigation without STP", available online at <https://www.youtube.com/watch?v=TWnEkuz6Et4>, Jun. 7, 2021, 9 pages.

* cited by examiner

LOOP PROTECTION IN A NETWORK

BACKGROUND

A network includes forwarding devices (e.g., switches, routers, or other communication devices) that receive data packets and pass the data packets along a selected path (selected from multiple possible paths) of the network. A data packet can refer to any unit of data that can be individually communicated over the network. Data packets can also be referred to as data frames, data segments, or other types of data units.

BRIEF DESCRIPTION OF THE DRAWINGS

Some implementations of the present disclosure are described with respect to the following figures.

Figure 1:
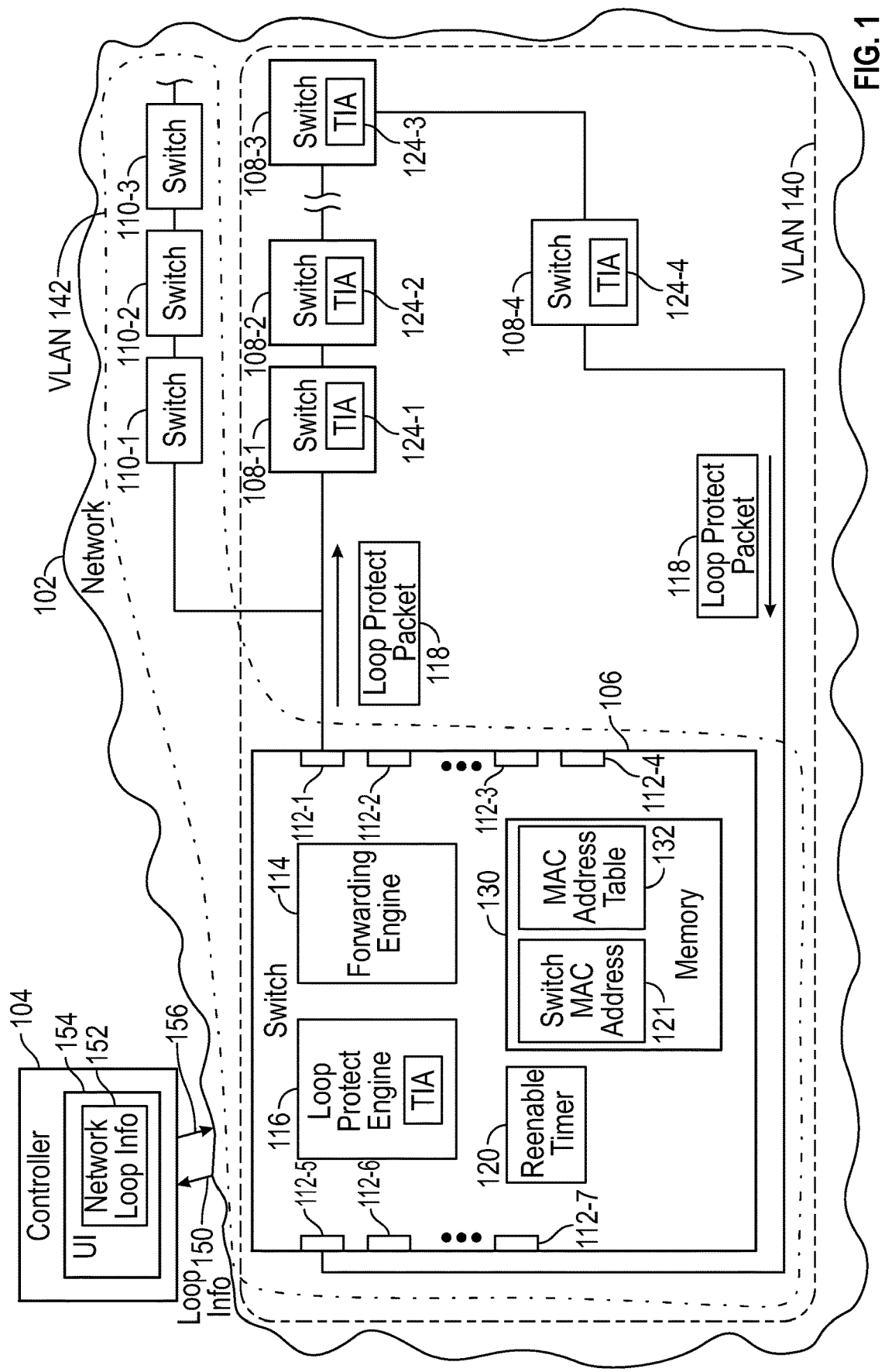
FIG. 1 is a block diagram arrangement that includes a network with multiple switches that are able to perform network loop protection according to some examples.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

A mis-configured network can include a network loop. A network loop occurs if there are multiple paths between a source forwarding device and a destination forwarding device. If a network loop is present, data packets sent by the source forwarding device over a first path to the destination forwarding device may return to the source forwarding device over a second path. Note that each of the paths between the source forwarding device and the destination forwarding device may include zero or more other forwarding devices.

Network loops can lead to increased network traffic that can burden a network. For example, if there are large quantities of broadcast or multicast data packets, the presence of network loops can lead to broadcast storms when forwarding devices continually re-broadcast or re-multicast the data packets. Broadcast storms can overwhelm the network such that entities trying to communicate data or access resources over the network may experience significant delays or dropped data packets or receive errors indicating that the requested resources are unavailable.

When a network loop is detected in a network, a port of a forwarding device may be disabled to break the network loop. In some examples, the forwarding device may include a reenable timer that is started in response to a port of the forwarding device being disabled due to detection of a network loop that includes the port. When the reenable timer expires, the port that was previously disabled is enabled again to allow sending of data packets from the port. However, if the network loop is not resolved, then the forwarding device may again detect the network loop and the port may be disabled again, at which point the reenable timer is started again. So long as the network loop remains unresolved, the port may toggle repeatedly between enabled and disabled states. Toggling the port between enabled and disabled states is disruptive to the operation of the forwarding device and can consume processing resources of the forwarding device. Also, reenabling the port when the network loop has not been resolved can lead to increased network traffic due to presence of the network loop.

The inability to resolve the network loop while the port of the forwarding device is disabled may be due to insufficient information relating to the network loop. For example, a network administrator may be notified of the presence of the network loop, but the network administrator may not know what is causing the network loop.

In accordance with some implementations of the present disclosure, a forwarding device detects a network loop for a port of the forwarding device, and determines whether a quantity of network loop detections for the port exceeds a threshold. If so, the switch adds a first information element indicating an identity of the forwarding device to a payload of a loop protect packet, and sends the loop protect packet containing the first information element from the port to the network. If the switch receives the loop protect packet (which indicates that a network loop is present), the switch extracts information elements from the received loop protect packet, where the extracted information elements can include the first information element and at least a second information element added to the loop protect packet by at least another forwarding device. The information elements added to the loop protect packet by forwarding devices can include network addresses of the forwarding devices. In some examples, the information elements include type-length-value (TLV) information elements.

A "loop protect packet" refers to a control packet that is sent by a forwarding device for the purpose of determining if a network loop exists in a network. The header of the loop protect packet contains a source network address of the forwarding device that sent the loop protect packet. In some examples, a network address can include a layer 2 network address, such as a Media Access Control (MAC) address. Layer 2 refers to a data link layer that is part of the Open Systems Interconnection (OSI) model, for example. In other examples, network addresses can include a layer 3 network address (such as an Internet Protocol (IP) address) or other types of network addresses used to identify a source and a destination of a data packet.

A "forwarding device" can refer to any of a switch (layer 2 forwarding device), a router (layer 3 forwarding device), or other communication devices that forward data packets along selected paths based on network addresses in the data packets. In the ensuing discussion, reference is made to examples that include switches. Techniques or mechanisms according to some implementations of the present disclosure are applicable to other types of forwarding devices.

FIG. 1 is a block diagram of an example arrangement that includes a network 102 and a controller 104 that is coupled to the network 102. The controller 104 can include a computer or a collection of computers. In some examples, the controller 104 is used to manage operations of switches in the network 102.

The network 102 includes a switch 106 and other switches 108-1, 108-2, 108-3, 108-4, 110-1, 110-2, and 110-3.

Although a specific number of switches is shown in FIG. 1, in other examples, the network 102 can include a different number of switches.

Examples of components of the switch 106 are shown in FIG. 1. The other switches 108-1, 108-2, 108-3, 110-1, 110-2, and 110-3 can include similar components.

The switch 106 includes a forwarding engine 114 that forwards a data packet received by the switch 106 along a selected path. As used here, an "engine" can refer to one or more hardware processing circuits, which can include any or some combination of a microprocessor, a core of a multi-core microprocessor, a microcontroller, a programmable integrated circuit, a programmable gate array, or another hardware processing circuit. Alternatively, an "engine" can refer to a combination of one or more hardware processing circuits and machine-readable instructions (software and/or firmware) executable on the one or more hardware processing circuits.

The switch 106 includes various ports that are connected to paths in the network 102. A "path" can refer to a link or a trunk or any communication channel of the network 102. Note that a trunk may include multiple links. In the example of FIG. 1, the switch 106 includes ports 112-1, 112-2, 112-3, 112-4, 112-5, 112-6, and 112-7. Although a specific number of ports is shown in the switch 106 in FIG. 1, the switch 106 can include a different number of ports in other examples.

A "port" can refer to a physical communication interface of the switch 106. The port includes a physical connector and a signal transceiver to transmit and receive signals over a path connected to the port. In other examples, a "port" can refer to a virtual communication interface.

The switch 106 can receive a data packet at a first port, and the forwarding engine 114 can forward the data packet to a second port to communicate the data packet over a path of the network 102 towards a destination of the data packet. The forwarding engine 114 can select a path from multiple paths of the network 102 based on forwarding information stored in a memory 130 of the switch 106. The memory 130 can be implemented using one or more memory devices, including dynamic random access memory (DRAM) devices, static random access memory (SRAM) devices, flash memory devices, and/or other types of memory devices.

The forwarding information can be in the form of a MAC address table 132, for example. In other examples, other types of forwarding information can be used by the forwarding engine 114, such as a routing table or another type of forwarding information.

The MAC address table 132 includes entries where each entry associates a port number (or more generally, an identifier of a port) with a respective MAC address. In some cases, an entry of the MAC address table can associate a port number with a MAC address and an identifier of a virtual local area network (VLAN).

In some examples, VLANs can be defined on the network 102. A VLAN refers to a logical network that groups together a subset of devices, such as switches, that are part of a physical network, e.g., the network 102. Multiple VLANs can be defined on the network 102. In the example of FIG. 1, two VLANs 140 and 142 are depicted. The VLAN 140 employs the following switches of the network 102: 106, 108-1, 108-2, 108-3, and 108-4. The VLAN 142 employs the following switches: 106, 110-1, 110-2, and 110-3.

The forwarding engine 114 uses the entries of the MAC address table 132 to determine where to send a received data packet. Specifically, a data packet can contain both a source MAC address that identifies a source of the data packet (i.e., an endpoint that sent the data packet) and a destination MAC address that identifies the destination of the data packet (i.e., an endpoint to which the data packet is destined). An "endpoint" can refer to a physical electronic device or a virtual device.

The forwarding engine 114 can perform a lookup of the MAC address table 132 to determine whether the destination MAC address of the data packet is in the MAC address table 132. If the destination MAC address matches a MAC address in an entry of the MAC address table 132, the forwarding engine 114 selects the port associated with the MAC address in the matching entry. The data packet is sent by the forwarding engine 114 over the selected port.

If no matching entry is found in the MAC address table 132, the forwarding engine 114 broadcasts the data packet to all ports of the switch 106.

In examples in which VLANs are employed, each entry of the MAC address table 132 associates a port number with a MAC address and a VLAN identifier (ID). In such examples, a data packet received by the switch 106 includes a source MAC address, a destination MAC address, and a VLAN ID that identifies a VLAN in which the data packet is to be communicated. The forwarding engine 114 performs a lookup of the MAC address table 132 to determine whether the destination MAC address and the VLAN ID of the data packet is in the MAC address table 132. If a matching entry exists in the MAC address table 132, the forwarding engine 114 selects a port of the switch 106 over which the data packet is sent. The selected port is part of the VLAN identified by the VLAN ID of the data packet.

In accordance with some implementations of the present disclosure, the switch 106 further includes a loop protect engine 116, which is able to detect a presence of a network loop in the network 102 and to perform a remediation action according to some implementations of the present disclosure to address the detected network loop.

Figure 2:
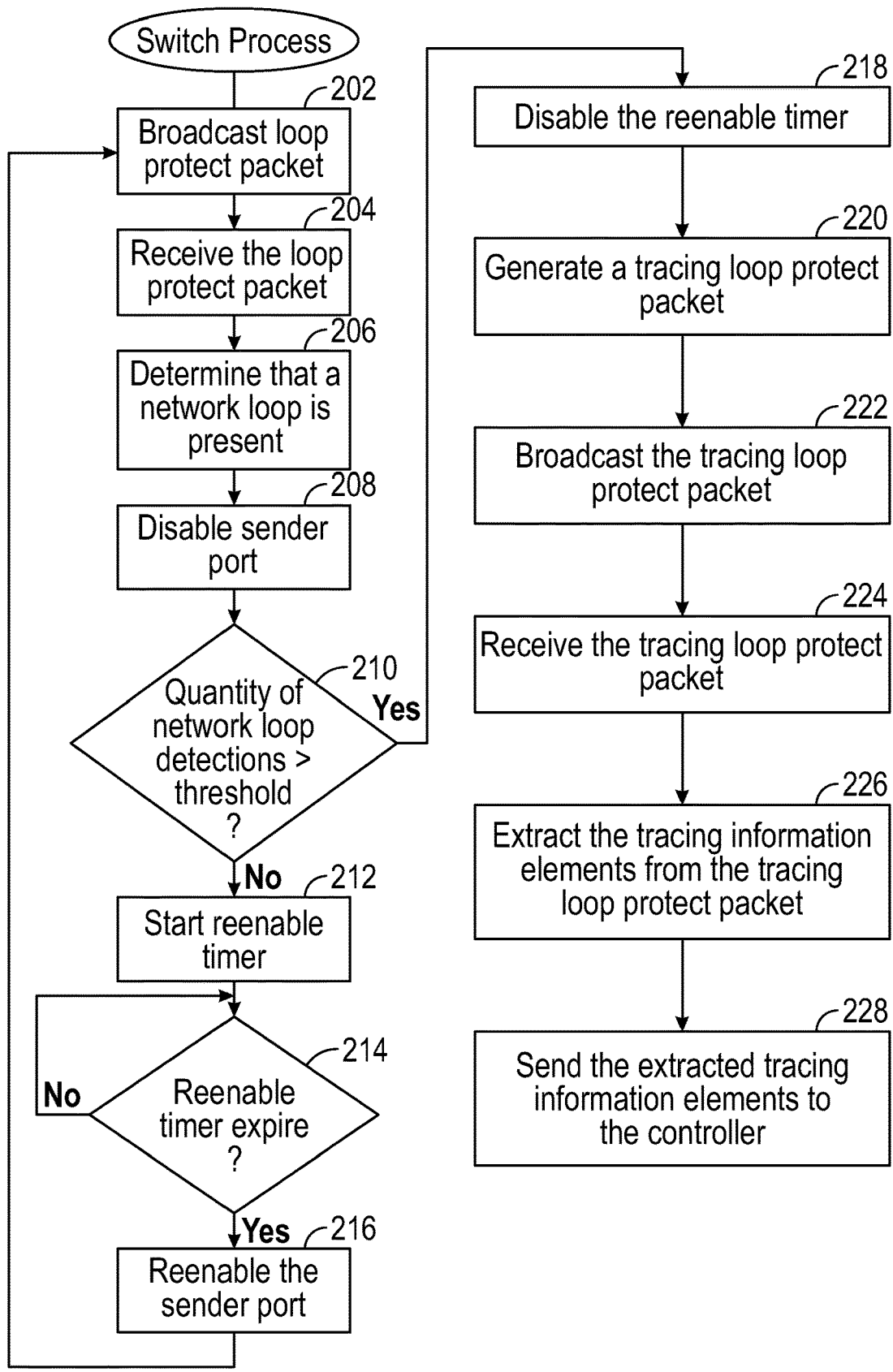
FIG. 2 is a flow diagram of a process of a switch according to some examples.

The following discussion refers to both FIGS. 1 and 2. As shown in FIG. 2, the loop protect engine 116 generates a loop protect packet 118 that is broadcast (at 202) by the loop protect engine 116 from a sender port of the switch 106. Note that the loop protect engine 116 may broadcast the loop protect packet 118 from multiple ports of the switch 106.

The sender port of the switch 106 is the port from which the switch 106 sends a data packet originated by the switch 106. In the example of FIG. 1, the sender port for the loop protect packet 118 is the port 112-1 (in other examples, the loop protect packet 118 may be sent from multiple sender ports of the switch 106).

A loop protect packet 118 differs from a data packet in that the loop protect packet 118 is used for the purpose of detecting a network loop, whereas a data packet carries information sent by a source endpoint to a destination endpoint as part of operations of the source and destination endpoints.

In the example of FIG. 1, a network loop exists that causes the loop protect packet 118 to be communicated through switches 108-1, 108-2, 108-3, and 108-4 back to the switch 106. The loop protect packet 118 sent by the switch 108-4 is received (at 204) at the port 112-5 of the switch 106. Generally, a network loop exists if a loop protect packet sent from a sender port of a switch is received by the switch at any of the ports of the switch, which can include the sender port or any other port of the switch.

In response to receipt of the loop protect packet 118 at the switch 106, the loop protect engine 116 compares the source MAC address in the received loop protect packet 118 to a switch MAC address 121 of the switch 106. The switch MAC address 121 is the MAC address assigned to the switch 106, such as by an administrator or another type of entity, including a program or machine. The switch MAC address 121 is stored in the memory 130 of the switch 106. If the source MAC address of the loop protect packet 118 matches the switch MAC address 121, the loop protect engine 116 determines (at 206) that a network loop is present in the network 102. The detected network loop includes the sender port 112-1.

Each port of the switch 106 can be associated with one or more VLANs. A port is associated with a VLAN if a port is employed to communicate data packets of the VLAN. A port may be associated with multiple VLANs. A first port may be associated with a first VLAN but not a second VLAN, while a second port may be associated with the second VLAN and not the first VLAN. A port not associated with a given VLAN would not be used to send a data packet over the given VLAN.

In some examples, network loop protection can be defined for specific VLANs. For example, network loop detection may be enabled for a first VLAN but not enabled for a second VLAN. In such an example, loop protect packets will be sent over the first VLAN (for which network loop protection is enabled) but would not be sent over the second VLAN (for which network loop protection is not enabled). If a given port is part of multiple VLANs for which network loop protection is enabled, the loop protect engine 116 can send a different loop protect packet from the given port for each of the multiple VLANs. For example, the loop protect engine 116 can send a first loop protect packet from the given port over a first VLAN of the multiple VLANs, the loop protect engine 116 can send a second loop protect packet from the given port over a second VLAN of the multiple VLANs, and so forth.

Network loop protection can be configured for specific ports and VLANs using configuration information provided to the switch 106, such as from the controller 104. The configuration information may be stored in the memory 130 of the switch 106, for example. The configuration can include the following information: for each port, identify one or more VLANs for which network loop protection is enabled.

More generally, network loop protection can be enabled or disabled for any port of a switch, regardless of whether VLANs are employed in a network.

In response to detecting a network loop that includes the sender port 112-1, the loop protect engine 116 disables (at 208) the sender port 112-1. In accordance with some implementations of the present disclosure, the loop protect engine 116 also determines (at 210) if a quantity of detections of network loops on the sender port 112-1 of the switch 106 exceeds a threshold. In examples where VLANs are employed, the determination made at 210 is regarding whether a quantity of detections of network loops on the sender port 112-1 for a given VLAN exceeds the threshold. Note that when a sender port is disabled, the switch 106 would be unable to transmit data packets from the sender port for any VLAN that the sender port is part of.

The threshold may be a statically configured value (e.g., the threshold is set to zero or a non-zero value such as 1, 2, 3, etc.). In other examples, the threshold may be dynamically adjustable, such as by the controller 104 or another entity. A more specific technique of defining the threshold is provided further below.

The loop protect engine 116 includes a reenable timer 120, which can be started based on disabling the sender port 112-1. The reenable timer 120 is configured to count a specified amount of time (e.g., count a specified number of clock cycles). The reenable timer 120 can start at an initial low value (e.g., zero) and increment in value until a timeout condition is met. Alternatively, the reenable timer 120 can start at an initially high value and decrement until a timeout condition is satisfied.

Upon expiration of the reenable timer 120, the loop protect engine 116 reenables a previously disabled port, including the sender port 112-1. The disabling of the sender port 112-1 for the time interval counted by the reenable timer 120 is to provide an opportunity for a network administrator or another entity to address the network loop (such as by reconfiguring a network path in the network 102 or removing or adding components to remove the network loop). In some examples, the loop protect engine 116 may issue an alert to the network administrator, such as by sending a message (e.g., an email message, a text message) or by providing another type of alert. In response to the alert, the network administrator may attempt to address the network loop.

Note that if there are multiple disabled ports of the switch 106 due to detection of network loops on those ports, a timeout of the reenable timer 120 will cause the loop protect engine 116 to re-enable each of the previously disabled ports. In some examples, the switch 106 includes one reenable timer 120. In other examples, the switch 106 can include multiple reenable timers, where each reenable timer is associated with a corresponding port or a corresponding group of ports.

Note that the network administrator or another entity may not have been able to resolve the network loop that includes the port 112-1 during the time interval counted by the reenable timer 120. After the sender port 112-1 is reenabled upon expiration of the reenable timer 120, the loop protect engine 116 will detect the network loop again if the loop protect engine 116 sends another loop protect packet through the sender port 112-1. In response to the second detection of the network loop, the loop protect engine will again disable the sender port 112-1, and restart the reenable timer 120. The sender port 112-1 can then be re-enabled again upon timeout of the reenable timer 120. This process can repeat multiple times, which causes the sender port 112-1 to toggle between enabled and disabled states.

If the loop protect engine 116 determines (at 210) that the quantity of detections of network loops on the sender port 112-1 of the switch 106 does not exceeds the threshold, the loop protect engine 116 starts (at 212) the reenable timer 120. In response to expiration (at 214) of the reenable timer 120, the loop protect engine 116 reenables (at 216) the sender port 112-1, and the loop protect engine 116 returns to task 202 to generate and send another loop protect packet.

If the loop protect engine 116 determines (at 210) that the quantity of detections of network loops on the sender port 112-1 (for a given VLAN) exceeds the threshold, the loop protect engine 116 disables (at 218) the reenable timer 120. Disabling the reenable timer 120 can refer to not starting the reenable timer 120 in response to disabling the sender port (at 208).

In addition, the loop protect engine 116 generates (at 220) a "tracing" loop protect packet in which the loop protect engine 116 adds a tracing information element that is used for tracing the network loop. In the example of FIG. 1, a tracing information addition (TIA) logic 122 in the loop protect engine 116 adds the tracing information element to the tracking loop protect packet. Examples of a tracing information element are discussed further below. The tracing information addition logic 122 can be part of the hardware processing circuitry of the loop protect engine 116, or alternatively, can include machine-readable instructions executable by the loop protect engine 116.

The loop protect engine 116 broadcasts (at 222) the tracing loop protect packet from the sender port 112-1. As the tracing loop protect packet traverses the network loop that includes the switches 108-1, 108-2, 108-3, and 108-4, each of the switches 108-1, 108-2, 108-3, and 108-4 adds a corresponding tracing information element to the tracking loop protect packet.

More specifically, in response to receiving the tracing loop protect packet, a tracing information addition logic 124-1 in the switch 108-1 adds a tracing information element to the tracing loop protect packet, and broadcasts the tracing loop protect packet from the switch 108-1. Similarly, in response to receiving the tracing loop protect packet, a tracing information addition logic 124-2 in the switch 108-2 adds a tracing information element to the tracing loop protect packet, and broadcasts the tracing loop protect packet from the switch 108-2. In response to receiving the tracing loop protect packet, a tracing information addition logic 124-3 in the switch 108-3 adds a tracing information element to the tracing loop protect packet, and broadcasts the tracing loop protect packet from the switch 108-3. In response to receiving the tracing loop protect packet, a tracing information addition logic 124-4 in the switch 108-4 adds a tracing information element to the tracing loop protect packet, and broadcasts the tracing loop protect packet from the switch 108-4. Each of the tracing information addition logic 124-1, 124-2, 124-3, and 124-4 can be part of a respective loop protect engine (not shown) in the corresponding switch.

Once the switch 106 receives (at 224) the tracing loop protect packet (after the tracing loop protect packet has traversed the network loop including the switches 108-1 to 108-4), the loop protect engine 116 extracts (at 226), from the received tracing loop protect packet, the tracing information elements added to the tracing loop protect packet, including the tracing information elements added by the switches 106 and 108-1 to 108-4. The loop protect engine 116 sends (at 228) the extracted tracing information elements as part of loop information 150 from the switch 106 to the controller 104.

The controller 104 can present network loop information 152 in a user interface 154, which can be displayed by a display device. In some examples, the network loop information 152 can be displayed in graphical form to depict the switches and ports in the network loop. The display device can be part of the controller 104, or can be remote from the controller 104. A network administrator can use the network loop information 152 to take action to resolve the network loop. In other examples, instead of or in addition to displaying the network loop information 152, the controller 104 can take an automated action to resolve the network loop, such as by reconfiguring a network path in the network 102 or removing or adding components to remove the network loop. For example, the controller 104 can issue control information 156 to one or more switches in the network 102 to perform the reconfiguration or other control action.

If the network loop is resolved, the controller 104 can send, to one or more switches in the network 102, an indication that the network loop has been resolved for a given port. If a switch had previously disabled the reenable timer due to detecting that a quantity of network loop detections exceeds the threshold, then the indication can cause the switch to reenable the reenable timer to allow the reenable timer to again be used in response to detecting network loops. Also, the indication that the network loop has been resolved for the given port causes the switch to reenable the given port that was previously disabled.

Figure 3:
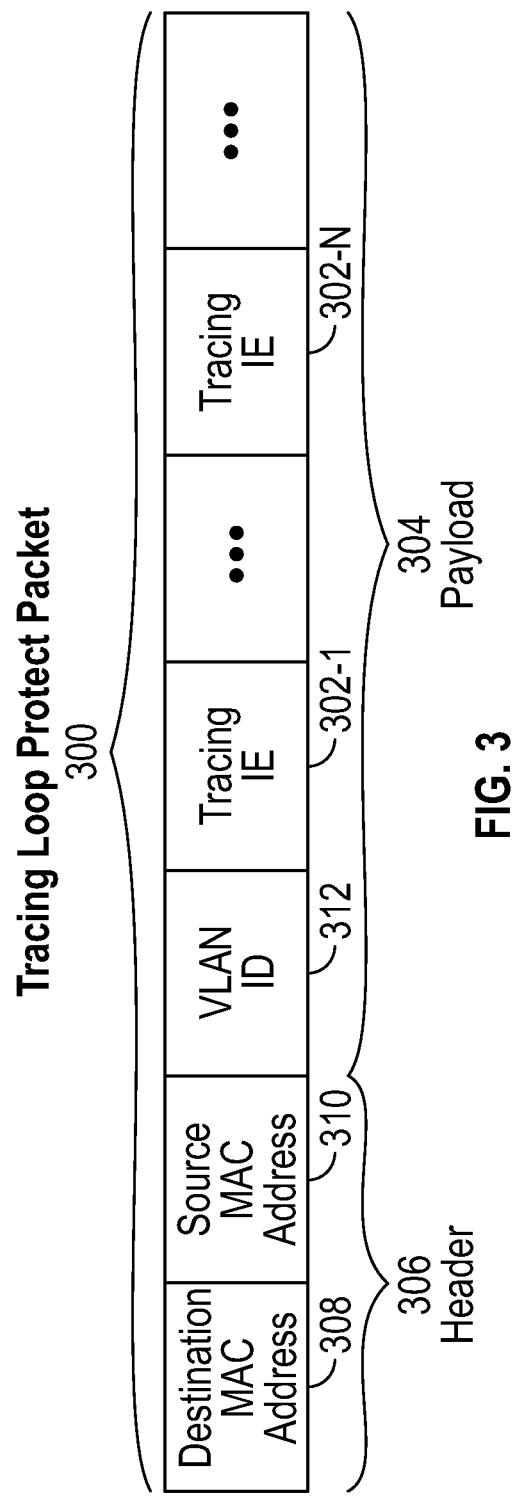
FIG. 3 is a block diagram of a tracing loop protect packet according to some examples.

FIG. 3 shows an example of a tracing loop protect packet 300 in which tracing information elements (e.g., 302-1 to 302-N, where N≥1) have been added to a payload 304 of the tracing loop protect packet 300. In examples where VLANs are used, the payload 304 also includes a VLAN information element 312, which includes information identifying a VLAN (VLAN ID) over which the tracing loop protect packet 300 is transmitted.

The tracing loop protect packet 300 also includes a header 306. The header 306 includes a destination MAC address field 308 and a source MAC address field 310. The destination MAC address field 308 contains a destination MAC address identifying endpoint(s) to which the tracing loop protect packet 300 is transmitted. In some examples, the destination MAC address can include a broadcast address that causes the tracing loop protect packet 300 to be broadcast to all destinations, such as to all destinations accessible by a given VLAN.

The source MAC address field 310 includes a source MAC address of a sender endpoint. For the tracing loop protect packet 200 transmitted by the switch 106, the source MAC address field 310 contains the switch MAC address 121 of the switch 106.

In accordance with some examples of the present disclosure, the tracing information element 302-1 added to the payload 304 includes the switch MAC address 121 of the switch 106 that transmitted the tracing loop protect packet 300.

As the tracing loop protect packet 300 traverses a network path through the network 102, each of the switches in the network path recognizes, such as based on the presence of one or more tracing information elements in the payload 304, that the tracing loop protect packet 300 is a modified version of a loop protect packet used to trace a network loop. For example, each tracing information element in the payload 304 includes a type indicator to indicate a type of the tracing information element as being used for tracing network loops. The tracing information element 302-N includes a MAC address of a switch that added the tracing information element 302-N to the payload 304 of the tracing loop protect packet 300.

In response to detecting a tracing information element, each switch that receives the tracing loop protect packet 300 adds a respective tracing information element to the payload 304 of the tracing loop protect packet 300. The switches 108-1 to 108-4 includes respective tracing information addition logic 124-1 to 124-4 that are able to add respective tracing information elements to the payload 304.

Although specific pieces of information are depicted as being part of the tracing loop protect packet 300, in other examples, additional pieces of information may be included, or alternative pieces of information may be included.

When the switch 106 receives the tracing loop protect packet 300 that has traversed the network loop, the loop protect engine 116 can extract, from the tracing information elements 302-1 to 302-N, the MAC addresses of all the switches in the network loop through which the loop protect packet 300 traversed. The extracted switch MAC addresses can be sent as part of the loop information 150 from the switch 106 to the controller 104.

In some examples, the threshold to which the quantity of network loop detections is compared (at 210 in FIG. 2) can be dynamically set based on an overall quantity of network loops detected on a given port, which can be determined from historical data collected by the loop protect engine 116. For example, assume the given port of the switch 106 is part of VLANs X, Y, and Z. The loop protect engine 116 collets historical data of detected network loops on the given port, where the historical data indicates that a network loop was detected for VLAN X two times, a network loop was detected for VLAN Y three times, and a network loop was detected for VLAN Z once. Based on this, the overall quantity (M) of detected network loops on the given port is 2+3+1=6 (i.e., M=6).

The threshold can be derived based on M. For example, the threshold can be equal M−b, where b is a predefined constant. In a specific example, if b=4, then M−b=2 in the foregoing example. In this example, the loop protect engine 116 would disable the given port for VLAN Y since the quantity of detected network loops (3) for VLAN Y exceeds the threshold (2). Thus, the loop protect engine 116 would follow the "Yes" path from the decision diamond 210 in FIG. 2 when the network loop is detected for VLAN Y three times.

As noted above, a tracing information element added to a payload of a tracing loop protect packet includes a type indicator to indicate a type of the tracing information element as being used for tracing network loops. In some examples, a tracing information element may include a type-length-value (TLV) information element. TLV refers to an encoding scheme used to encode data that can be included in a data packet. The "type" indicated by the TLV information element can identify the type of the information element, and the "length" specifies the length of the TLV information element. The "value" is the actual information included in the TLV information element. In a tracing information element, the "value" is a switch MAC address of the switch that added the tracing information element.

Figure 4:
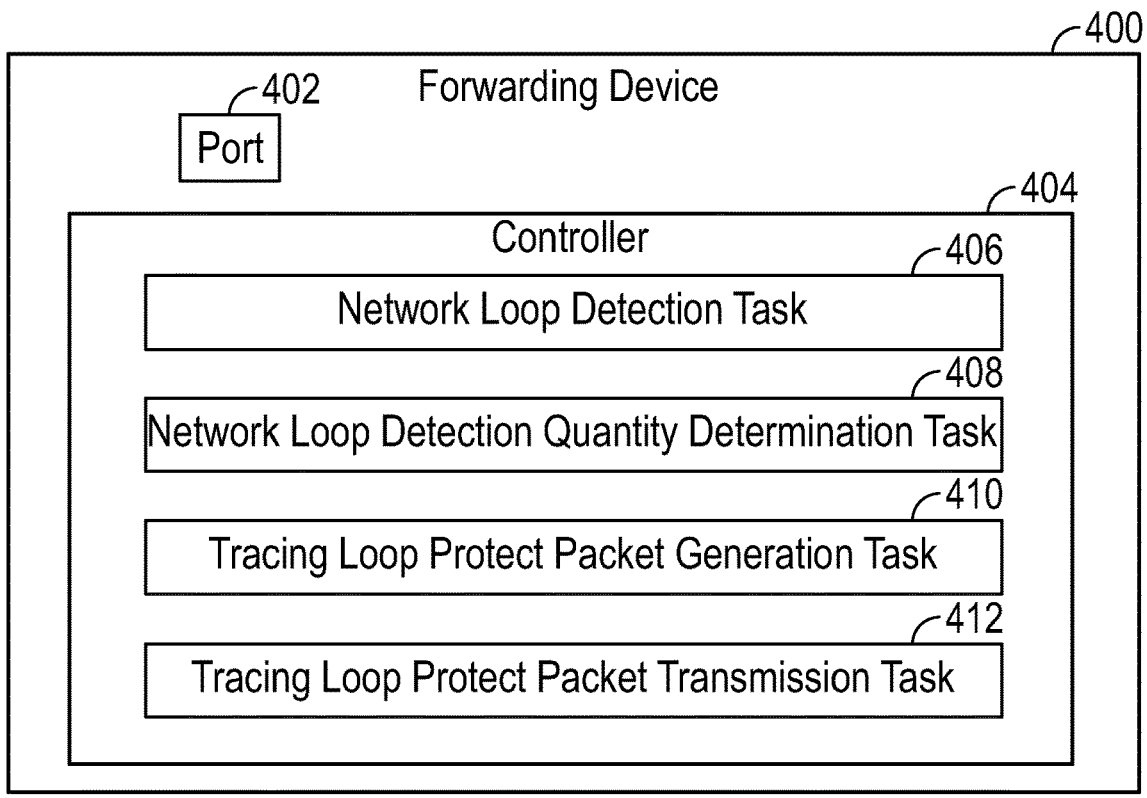
FIG. 4 is a block diagram of a forwarding device for a network, according to some examples.

FIG. 4 is a block diagram of a forwarding device 400 according to some examples. The forwarding device 400 can include a layer 2 switch or another type of forwarding device. The forwarding device 400 includes a port 402 and a controller 404 to perform various tasks of the forwarding device 400. The controller 404 can include one or more hardware processors of the forwarding device 400. A hardware processor can include a microprocessor, a core of a multi-core microprocessor, a microcontroller, a programmable integrated circuit, a programmable gate array, or another hardware processing circuit.

The tasks of the controller 404 include a network loop detection task 406 to detect a network loop for the port 402. The detection of the network loop can be based on broadcasting a loop protect packet from the port 402, and receiving the loop protect packet at the forwarding device 400 after the loop protect packet has traversed the network loop.

The tasks of the controller 404 include a network loop detection quantity determination task 408 to determine whether a quantity of network loop detections for the port exceeds a threshold. The quantity of network loop detections includes network loop detections detected based on broadcasting respective different loop protect packets from the port 402.

The tasks of the controller 404 include a tracing loop protect packet generation task 410 to, based on determining that the quantity of network loop detections for the port exceeds the threshold, add a first information element indicating an identity of the forwarding device to a payload of a tracing loop protect packet. An example of the tracing loop protect packet is the tracing loop protect packet 300 of FIG. 3. In some examples, the first information element includes a network address of the forwarding device, such as a MAC address of the forwarding device.

The tasks of the controller 404 include a tracing loop protect packet transmission task 412 to send the tracing loop protect packet containing the first information element from the port 402 to a network.

In some examples, the controller 404 receives the tracing loop protect packet at the forwarding device 400. The receiving of the tracing loop protect packet at the forwarding device 400 results from the network loop. The controller 404 extracts information elements in the payload of the received tracing loop protect packet, the extracted information elements indicating identities of forwarding devices in the network loop. For example, the extracted information elements include MAC addresses of the forwarding devices.

In some examples, the controller 404 disables the port 402 in response to detecting the network loop. The controller 404 disables a reenable timer for the port 402 based on determining that the quantity of network loop detections for the port exceeds the threshold.

In some examples, after the disabling of the reenable timer, the controller 404 receives an indication to enable the reenable timer. For example, a remote entity (e.g., the controller 104 of FIG. 1) can send, to the forwarding device 400, that an indication that the network loop has been resolved. In response to such an indication, the controller 404 can reenable the reenable timer that was previously disabled.

In some examples, the controller 404 causes display of a graphical representation of a network path including the network loop based on the extracted information elements. For example, the controller 404 can send network loop information including the extracted information elements to a remote entity (e.g., the controller 104 of FIG. 1) to cause a display of the graphical representation.

In some examples, the controller 404 computes the threshold based on a total quantity of detected network loops on the port. The total quantity of detected network loops on the port can be based on a sum of quantities of network loops detected for a plurality of VLANs that include the port.

In some examples, the controller 404 computes the threshold by subtracting a predefined constant from the total quantity of detected network loops on the port.

In some examples, the determining of whether the quantity of network loop detections for the port exceeds the threshold includes determining whether a quantity of network loop detections for a VLAN of the plurality of VLANs exceeds the threshold.

Figure 5:
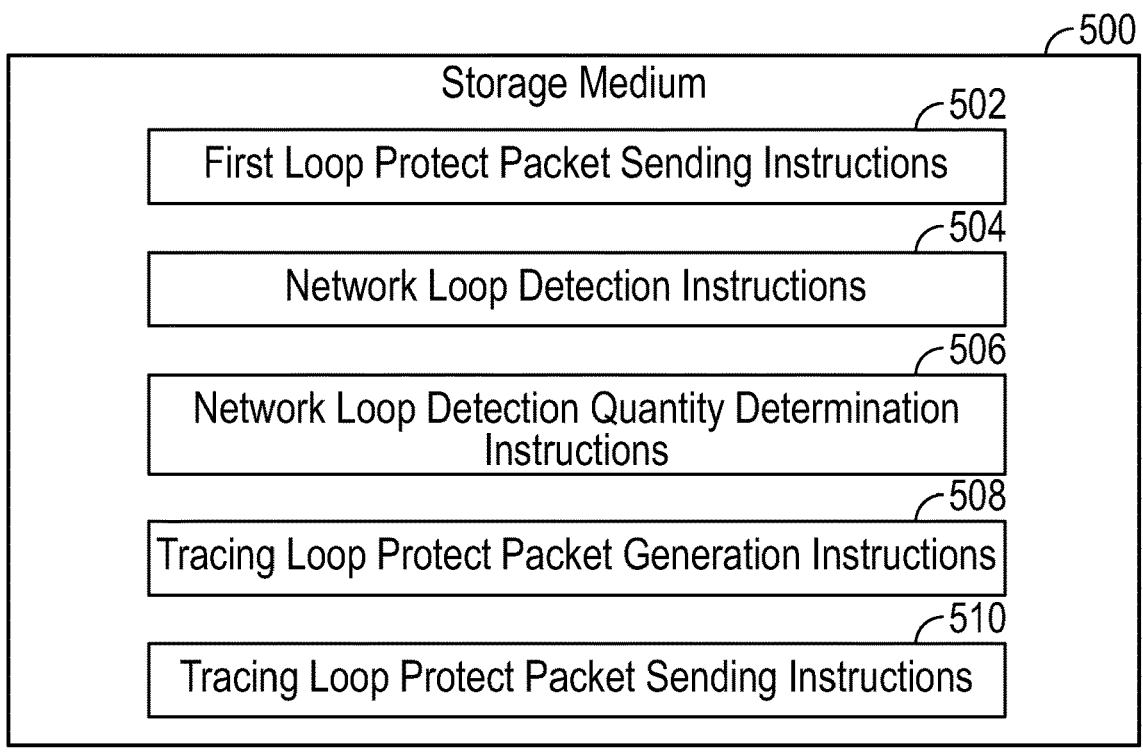
FIG. 5 is a block diagram of a storage medium storing machine-readable instructions according to some examples.

FIG. 5 is a block diagram of a non-transitory machine-readable or computer-readable storage medium 500 storing machine-readable instructions that upon execution cause a switch to perform various tasks.

The machine-readable instructions include first loop protect packet sending instructions 502 to send a first loop protect packet from a port of the switch. The machine-readable instructions include network loop detection instructions 504 to detect a network loop for the port based on receiving the first loop protect packet.

The machine-readable instructions include network loop detection quantity determination instructions 506 to determine whether a quantity of network loop detections for the port exceeds a threshold. The machine-readable instructions can send successive loop protect packets and can count how many times network loops are detected for the port based on the loop protect packets.

The machine-readable instructions include tracing loop protect packet generation instructions 508 to, based on determining that the quantity of network loop detections for the port exceeds the threshold, generate a tracing loop protect packet and add a first tracing information element indicating an identity of the forwarding device to a payload of the tracing loop protect packet. The first tracing information element added can include a network address of the forwarding device.

The machine-readable instructions include tracing loop protect packet sending instructions 510 to send the tracing loop protect packet containing the first tracing information element from the port to the network. If the network loop is still present, the switch would receive the tracing loop protect packet after traversal of the tracing loop protect packet through the network loop.

Figure 6:
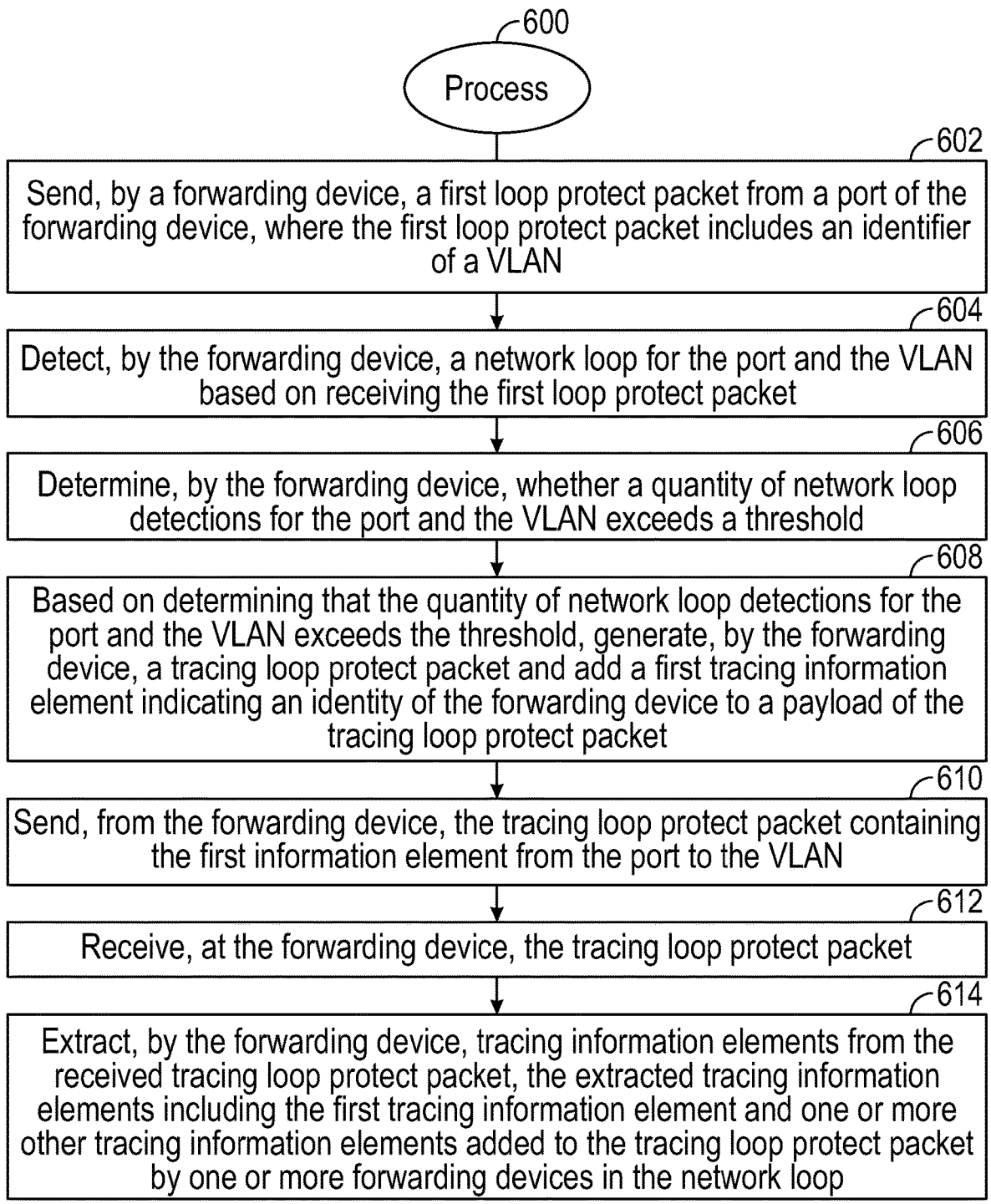
FIG. 6 is a flow diagram of a process of a forwarding device according to some examples.

FIG. 6 is a flow diagram of a process 600 performed by a forwarding device, such as a switch.

The process 600 includes sending (at 602), by a forwarding device, a first loop protect packet from a port of the forwarding device, where the first loop protect packet includes an identifier of a VLAN.

The process 600 includes detecting (at 604), by the forwarding device, a network loop for the port and the VLAN based on receiving the first loop protect packet.

The process 600 includes determining (at 606), by the forwarding device, whether a quantity of network loop detections for the port and the VLAN exceeds a threshold.

Based on determining that the quantity of network loop detections for the port and the VLAN exceeds the threshold, the process 600 includes generating (at 608), by the forwarding device, a tracing loop protect packet and adding a first tracing information element indicating an identity of the forwarding device to a payload of the tracing loop protect packet.

The process 600 includes sending (at 610), from the forwarding device, the tracing loop protect packet containing the first tracing information element from the port to the VLAN. The process 600 includes receiving (at 612), at the forwarding device, the tracing loop protect packet.

The process 600 includes extracting (at 614), by the forwarding device, tracing information elements from the received tracing loop protect packet, the extracted tracing information elements including the first tracing information element and one or more other tracing information elements added to the tracing loop protect packet by one or more forwarding devices in the network loop.

A storage medium (e.g., 500 in FIG. 5) can include any or some combination of the following: a semiconductor memory device such as a DRAM or SRAM, an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the present disclosure, use of the term "a," "an," or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A forwarding device for a network, comprising:
a port; and
a controller to:
   detect a network loop for the port,
   determine whether a quantity of network loop detections for the port exceeds a threshold,
   based on determining that the quantity of network loop detections for the port exceeds the threshold, add a first information element indicating an identity of the forwarding device to a payload of a loop protect packet, and
   send the loop protect packet containing the first information element from the port to the network,
   wherein the controller is to compute the threshold based on a total quantity of detected network loops on the port, and
   wherein the total quantity of detected network loops on the port comprises a sum of quantities of network loops detected for a plurality of virtual local area networks (VLANs) that comprise the port.

2. The forwarding device of claim 1, wherein the first information element comprises a network address of the forwarding device.

3. The forwarding device of claim 2, wherein the network address comprises a Media Access Control (MAC) address of the forwarding device.

4. The forwarding device of claim 1, wherein the controller is to:
receive the loop protect packet at the forwarding device, wherein the receiving of the loop protect packet at the forwarding device results from the network loop, and
extract information elements in the payload of the received loop protect packet, the extracted information elements indicating identities of forwarding devices in the network loop.

5. The forwarding device of claim 4, wherein the identities of the forwarding devices in the network loop comprise Media Access Control (MAC) addresses of the forwarding devices in the network loop.

6. The forwarding device of claim 4, wherein the controller is to:
disable the port in response to detecting the network loop, and
disable a reenable timer for the port based on determining that the quantity of network loop detections for the port exceeds the threshold.

7. The forwarding device of claim 6, wherein the controller is to:

after the disabling of the reenable timer, receive an indication to enable the reenable timer.

8. The forwarding device of claim 4, wherein the controller is to:
cause display of a graphical representation of a network path including the network loop based on the extracted information elements.

9. The forwarding device of claim 4, wherein the information elements extracted from the received loop protect packet comprise the first information element and at least a second information element added to the loop protect packet by at least one other forwarding device.

10. The forwarding device of claim 9, wherein the first information element comprises a network address of the forwarding device, and the second information element comprises a network address of the at least one other forwarding device.

11. The forwarding device of claim 1, wherein the controller is to compute the threshold by subtracting a predefined constant from the total quantity of detected network loops on the port.

12. The forwarding device of claim 1, wherein the determining of whether the quantity of network loop detections for the port exceeds the threshold comprises determining whether a quantity of network loop detections for a VLAN of the plurality of VLANs exceeds the threshold.

13. The forwarding device of claim 1, wherein the controller is to:
disable the port in response to detecting the network loop, based on determining that the quantity of network loop detections for the port does not exceed the threshold, start a reenable timer for the port, and
in response to an expiration of the reenable timer, reenable the port that was disabled.

14. A non-transitory machine-readable storage medium comprising instructions that upon execution cause a switch to:
compute a threshold based on a total quantity of detected network loops on a port of the switch, wherein the total quantity of detected network loops on the port comprises a sum of quantities of network loops detected for a plurality of virtual local area networks (VLANs) that comprise the port;
send a first loop protect packet from the port of the switch;
detect a network loop for the port based on receiving the first loop protect packet;
determine whether a quantity of network loop detections for the port exceeds the threshold;
based on determining that the quantity of network loop detections for the port exceeds the threshold, generate a tracing loop protect packet and add a first tracing information element indicating an identity of the switch to a payload of the tracing loop protect packet; and
send the tracing loop protect packet containing the first tracing information element from the port to a network.

15. The non-transitory machine-readable storage medium of claim 14, wherein the instructions upon execution cause the switch to:
receive the tracing loop protect packet at the switch, wherein the receiving of the loop protect packet at the switch results from the network loop; and
extract information elements in the payload of the received loop protect packet, the extracted information elements indicating identities of switches in the network loop.

16. The non-transitory machine-readable storage medium of claim 15, wherein the instructions upon execution cause the switch to:
send, to a controller, network loop information based on the extracted information elements; and
receive, from the controller, an indication that the network loop has been resolved.

17. The non-transitory machine-readable storage medium of claim 14, wherein the instructions upon execution cause the switch to:
compute the threshold by subtracting a predefined constant from the total quantity of detected network loops on the port; and
wherein the instructions to determine of whether the quantity of network loop detections for the port exceeds the threshold comprise instructions to determine whether a quantity of network loop detections for a VLAN of the plurality of VLANs exceeds the threshold.

18. A method comprising:
computing a threshold based on a total quantity of detected network loops on a port of a forwarding device, wherein the total quantity of detected network loops on the port comprises a sum of quantities of network loops detected for a plurality of virtual local area networks (VLANs) that comprise the port;
sending, by the forwarding device, a first loop protect packet from the port of the forwarding device, the first loop protect packet comprising an identifier of a virtual local area network (VLAN);
detecting, by the forwarding device, a network loop for a given VLAN on the port based on receiving the first loop protect packet;
determining, by the forwarding device, whether a quantity of network loop detections for the given VLAN on the port exceeds the threshold;
based on determining that the quantity of network loop detections for the given VLAN on the port exceeds the threshold, generating, by the forwarding device, a tracing loop protect packet and adding a first tracing information element indicating an identity of the forwarding device to a payload of the tracing loop protect packet;
sending, from the forwarding device, the tracing loop protect packet containing the first tracing information element from the port to the VLAN;
receiving, at the forwarding device, the tracing loop protect packet; and
extracting, by the forwarding device, tracing information elements from the received tracing loop protect packet, the extracted tracing information elements comprising the first tracing information element and one or more other tracing information elements added to the tracing loop protect packet by one or more forwarding devices in the network loop.

19. The method of claim 18, wherein each of the tracing information elements in the received tracing loop protect packet comprises a type-length-value (TLV) information element.

20. The method of claim 18, wherein:
the computing the threshold comprises subtracting a predefined constant from the total quantity of detected network loops on the port.

* * * * *